(12) United States Patent
Babol et al.

(10) Patent No.: US 10,169,050 B1
(45) Date of Patent: Jan. 1, 2019

(54) SOFTWARE APPLICATION PROVISIONING IN A DISTRIBUTED COMPUTING ENVIRONMENT

(71) Applicant: International Business Machines Corporation, Armonk, NY (US)

(72) Inventors: Adam Babol, Lubartow (PL); Jan Galda, Nowy Sacz (PL); Piotr P. Godowski, Cracow (PL); Lukasz T. Jeda, Cracow (PL); Jacek Midura, Zabierzow (PL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/705,936

(22) Filed: Sep. 15, 2017

(51) Int. Cl.
- *G06F 9/44* (2018.01)
- *G06F 9/445* (2018.01)
- *G06F 8/60* (2018.01)
- *G06F 9/455* (2018.01)

(52) U.S. Cl.
CPC ............... *G06F 9/445* (2013.01); *G06F 8/60* (2013.01); *G06F 9/45558* (2013.01); *G06F 2009/45562* (2013.01)

(58) Field of Classification Search
None
See application file for complete search history.

(56) References Cited

U.S. PATENT DOCUMENTS

| | | | |
|---|---|---|---|
| 9,086,897 | B2 | 7/2015 | Oh et al. |
| 9,245,096 | B2 * | 1/2016 | Abuelsaad ............... G06F 8/61 |
| 2008/0028218 | A1 | 1/2008 | Simon |
| 2012/0072898 | A1 | 3/2012 | Pappas et al. |
| 2013/0283269 | A1 | 10/2013 | Jorgensen et al. |

OTHER PUBLICATIONS

"Virtual Desktop Monitoring," eG Innovations Solutions, printed Apr. 7, 2017, pp. 1-8. https://www.eginnovations.com/solutions/vdi-virtual-desktop-monitoring.

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

* cited by examiner

*Primary Examiner* — Qamrun Nahar
(74) *Attorney, Agent, or Firm* — James L. Olsen

(57) ABSTRACT

Aspects of the present disclosure relate to software provisioning in a computer system comprising client devices connected via a communication network to a computing infrastructure. The computing infrastructure is operable for providing, upon a user's request, a software application package to an already running machine. The software provisioning system is configured to retrieve session information about a user logged in to the computing infrastructure via a client device, thereby creating a session, determine a list of software application packages that the user is entitled to request to be provided to the running machine so that the user is able to use a software application contained in the software application packages and calculate software application usage information from the session information and the list of software application packages.

15 Claims, 5 Drawing Sheets

SOFTWARE APPLICATION PROVISIONING IN A DISTRIBUTED COMPUTING ENVIRONMENT

BACKGROUND

The present disclosure relates generally to distributed computing environments, and more particularly to software provisioning in a distributed computing environment.

It has become increasingly common to use client devices connected via a communication network to a computing infrastructure instead of using isolated single workstations. A user may log in to a running machine using a client device. The running machine may be, for example, the client device itself which provides a desktop environment or a distant machine which provides a remote desktop to the client device.

SUMMARY

Aspects of the present disclosure relate to a software provisioning system for a computer system comprising client devices connected via a communication network to a computing infrastructure. The computing infrastructure is operable for providing a virtual software application to an already running machine upon a user's request. The software provisioning system is operable for retrieving session information about a user logged into the computing infrastructure via the client device, thereby creating a session. Further, the software provisioning system is operable for determining a list of software application packages that the user is able to use. In addition, the software provisioning system is operable for calculating software application usage information from the session information and the list of software application packages.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure

Figure 1:
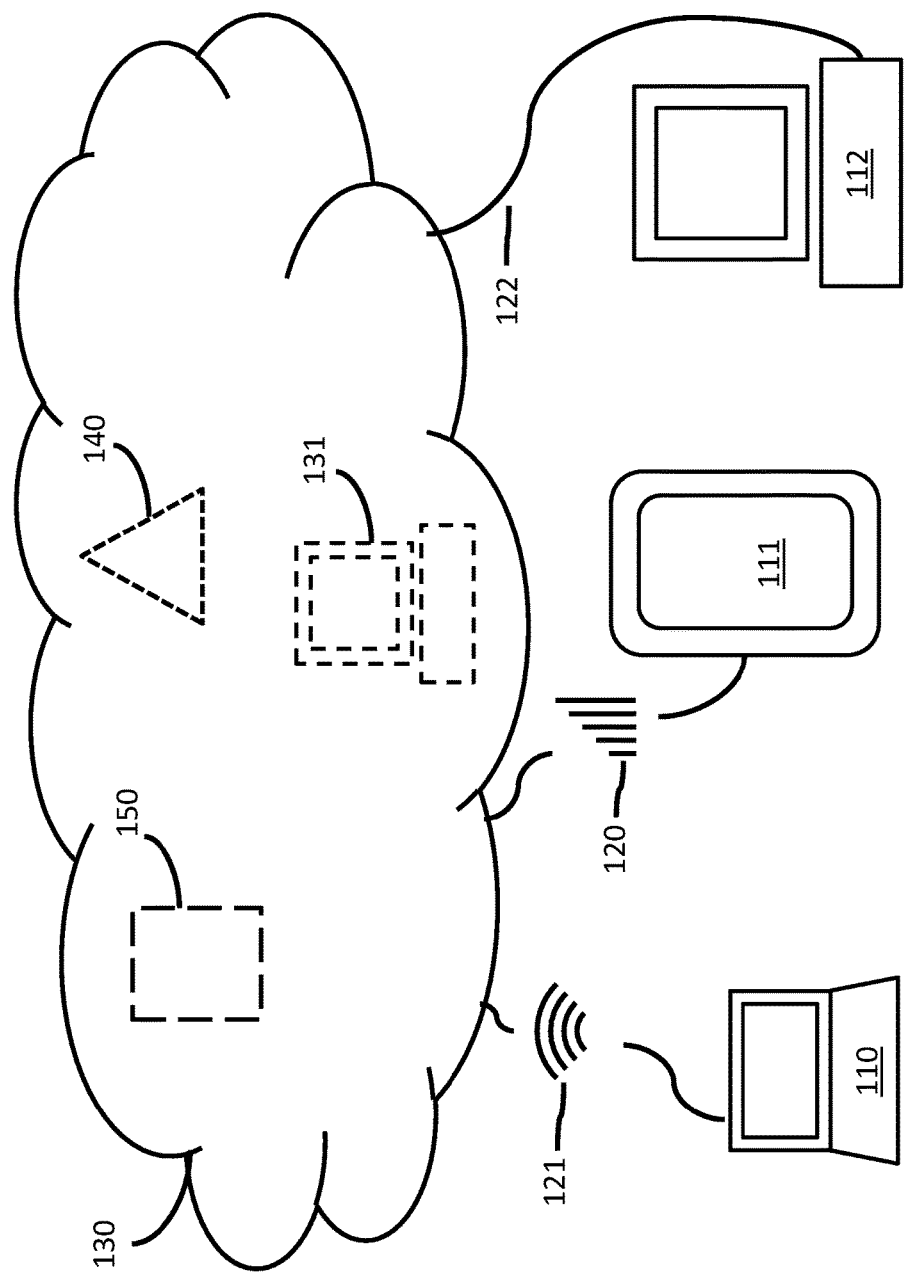
FIG. 1 is a diagram illustrating an exemplary computing infrastructure for implementing a software provisioning system, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure and certain features, advantages and details thereof, are explained more thoroughly below, with reference to the non-limiting example(s) illustrated in the accompanying drawings. Descriptions of well-known materials, systems, devices, processing techniques, etc. are omitted so as not to unnecessarily obscure the disclosure. It should be understood, however, that the detail description and the specific example(s), while indicating aspects of the disclosure, are given by way of illustration only, and are not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular application.

Instead of having all required software applications installed on the running machine, the computing infrastructure may provide the desired software application package to the running machine only upon the user's request.

For example, a user may click on an icon on the desktop or type-in a command and, in response thereto, a server streams the software application package to the running computer. The software application may be copied to the running computer and executed on the running computer locally, as if it was installed there permanently. The software application package may comprise all application files and settings to run the specific software application. The software application package including the application files and settings may be stored on the running machine only temporarily. In particular, the software application package may be present on the running machine only during the application usage and may be removed upon closing the application.

FIG. 1 is a diagram illustrating a computer system 100 comprising client devices 110, 111, 112 connected via a communication network 120, 121, 122 to a computing infrastructure 130.

The client devices 110, 111, 112 can comprise a notebook 110, a tablet computer 111 and/or a fixed computer 112. The communication network can be a mobile communication network 120, e.g., an LTE network, a WIFI network 121 or an ethernet network 122.

A user can log in to the computing infrastructure 130 via one of the client devices 110, 111, 112, for example, via the client device 110. The computing infrastructure can include a hypervisor 140 for instantiating a virtual machine 131 in response to the user logging in to the computing infrastructure. The instantiated virtual machine 131 can be considered as a running machine and a remote desktop can be provided to the client device 110 such that the user may interact with the virtual machine 131. In an alternative embodiment, the running machine can be the client device 110 itself and/or another physical machine provided within the computing infrastructure 130.

A software provisioning system 150 can retrieve session information about a user logged in to the computing infrastructure 130 via the client device 100. The time a user is logged in to the computing infrastructure 130 can also be referred to as a session. The session information can include at least one of start date and time of the session, end date and time of the session, user identification associated with the session, and/or client device identification of the client device.

The software provisioning system 150 can further determine a list of software packages that the user is entitled to request to be provided to the running machine 131 so that the user is able to use a software application contained in the software application package. In particular, the software provisioning system can determine at least one group of which the user is a member, identify a set of software applications a member of the group is entitled to use, and include the set of software applications in the list of software applications.

For example, the user may belong to a group of users having access to a set of software application packages required for simulating semiconductor circuits and to a group of users having access to a set of software application packages required for defining the physical layout of semiconductor circuits.

Hence, the list of software packages that the user is entitled to request to be provided to the running machine to be able to use a software application contained in the application packages can comprise both the set of software application packages required for simulating semiconductor circuits and the set of software application packages required for defining the physical layout of semiconductor circuits.

The software application usage information can be information on the software applications which were available to the user instead of information on the actual usage of the software application.

Those skilled in the art will note from the above description that, in one or more aspects, a software provisioning system is provided herein.

According to a first aspect, there is provided a software provisioning system for a computer system comprising client devices connected via a communication network to a computing infrastructure, the computing infrastructure being operable for providing upon a user's request a software application package to an already running machine, wherein the software provisioning system is operable for retrieving session information about a user logged in to the computing infrastructure via a client device, thereby creating a session; determining a list of software application packages that the user is entitled to request to be provided to the running machine so that the user is able to use a software application contained in the software application packages; and calculating software application usage information from the session information and the list of software application packages.

In an embodiment of the software provisioning system, the session information includes at least one of a start date and time of the session; an end date and time of the session; a user identification associated with the session; and/or client device identification of the client device.

An additional embodiment prescribes that the software provisioning system is operable for determining at least one group of which the user is a member, identifying a set of software applications a member of the group is entitled to use, and including the set of software applications in the list of software applications.

According to a further embodiment, the running machine is a virtual machine and the computing infrastructure comprises a hypervisor for instantiating the virtual machine in response to a user logging in to the computing infrastructure.

In another embodiment, the running machine is the client device.

According to another aspect, there is provided a method for software provisioning for a computer system comprising client devices connected via a communication network to a computing infrastructure, the computing infrastructure being operable for providing upon a user's request a software application package to an already running machine, wherein the method comprises retrieving session information about a user logged in to the computing infrastructure via a client device, thereby creating a session; determining a list of software application packages that the user is entitled to request to be provided to the running machine so that the user is able to use a software application contained in the application packages; and calculating software application usage information from the session information and the list of software application packages.

In an embodiment of the method, the session information includes at least one of start date and time of the session; end date and time of the session; user identification associated with the session; client device identification of the client device.

An additional embodiment prescribes that the method further comprises determining at least one group of which the user is a member, identifying a set of software applications a member of the group is entitled to use, and including the set of software applications in the list of software applications.

According to a further embodiment, the running machine is a virtual machine and the computing infrastructure comprises a hypervisor for instantiating the virtual machine in response to a user logging in to the computing system.

In an alternative embodiment of the method, the running machine is the client device.

According to a further aspect, a computer program product is provided, the computer program product being programmed for executing a method described herein when executed on a programmable computer. The computer program product may include a storage medium for storing the program, such as semiconductor storage (Flash, RAM, etc.) or magnetic or optical mass storage devices (optical discs, hard discs, etc.).

In some embodiments, software application provisioning includes licensing management.

Figure 2:
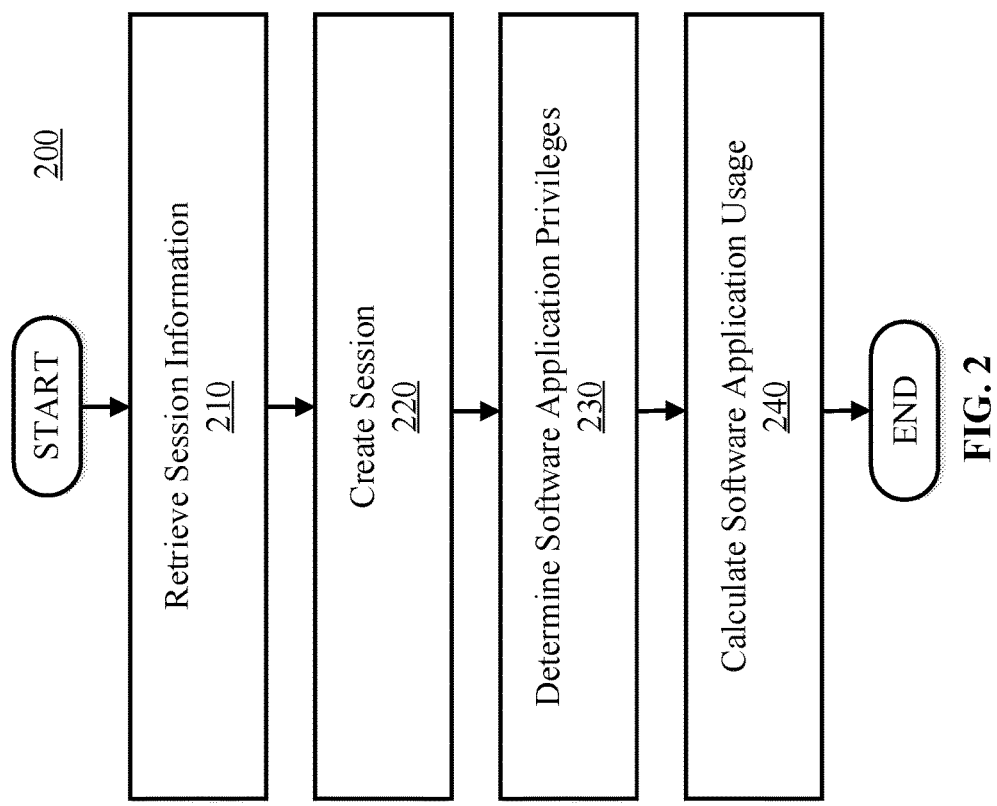
FIG. 2 is a flow chart illustrating an example method for provisioning software applications in a distributed computing environment, in accordance with embodiments of the present disclosure.

Referring now to FIG. 2, shown is a flow diagram illustrating an example method 200 for software provisioning in a distributed computing environment. Method 200 starts at operation 210, where session information is retrieved. Retrieving session information can include obtaining identity data relating to client devices (e.g., client devices 110, 111, and 112). This can include historical session data, user identification associated with the session; and client device identification (e.g., a MAC address, IP address, or client number associated with a client device). After session information is retrieved, the session can be created. This is illustrated at operation 220. Software privileges can then be determined for the specific client(s) in the system. This is illustrated at operation 230. Determining software privileges can include comparing licenses granted (e.g., or any other permission granted) for client devices to a list of all software applications for the system, and determining which software applications are accessible to each client (e.g., based on the granted permission). Further, software application usage information can be calculated based on the session information and the list of software application packages. This is illustrated at operation 240.

Figure 3:
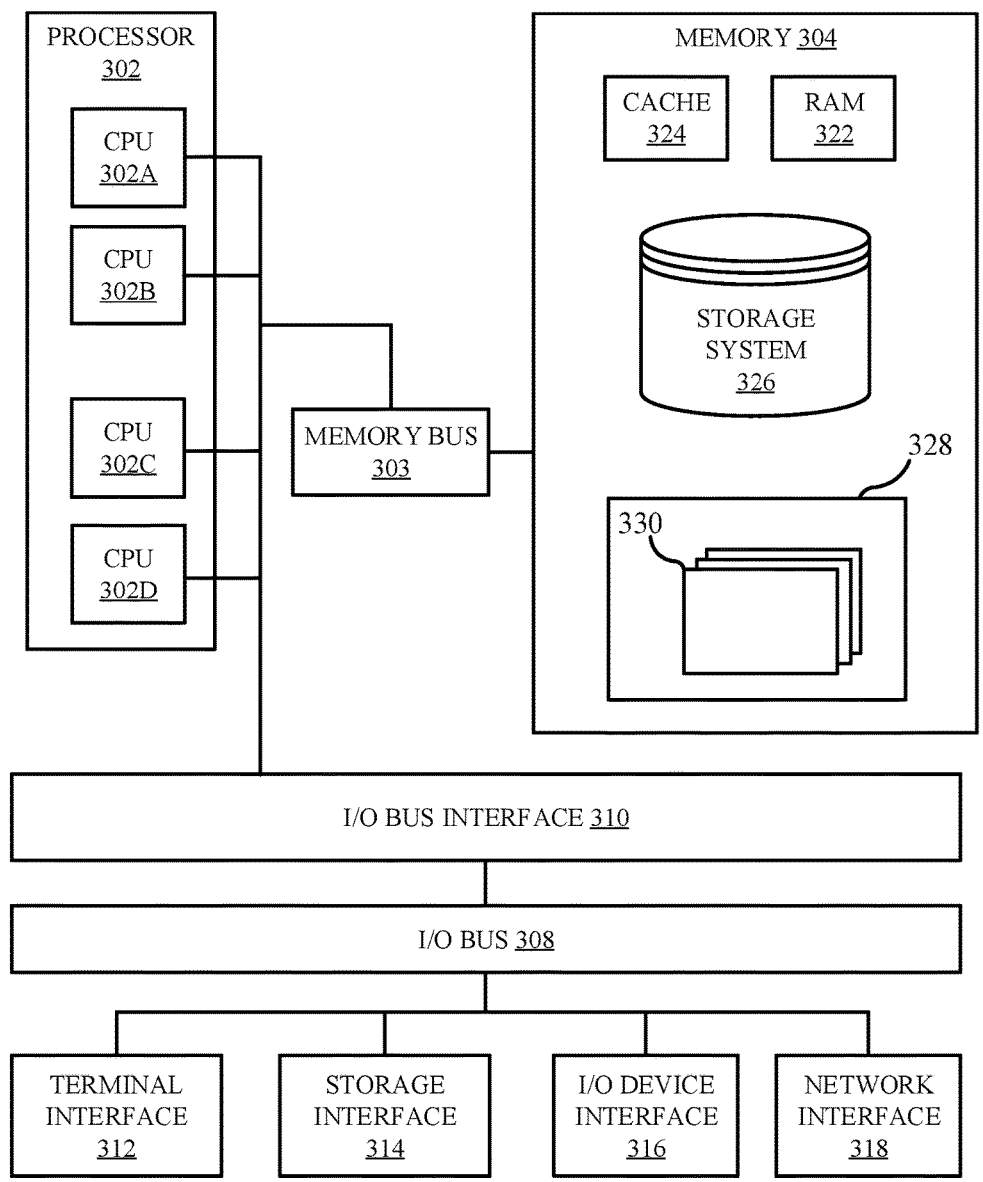
FIG. 3 is a high-level block diagram illustrating an example computer system that may be used in implementing one or more of the methods, tools, and modules, and any related functions, described herein, in accordance with embodiments of the present disclosure.

Referring now to FIG. 3, shown is a high-level block diagram of an example computer system 301 (e.g., client devices 110, 111, 112 and computing infrastructure 130) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 301 may comprise one or more CPUs 302, a memory subsystem 304, a terminal interface 312, a storage interface 316, an I/O (Input/Output) device interface 314, and a network interface 318, all of which may be communicatively coupled, directly or indirectly, for inter-component communication via a memory bus 303, an I/O bus 308, and an I/O bus interface unit 310.

The computer system 301 may contain one or more general-purpose programmable central processing units (CPUs) 302A, 302B, 302C, and 302D, herein generically referred to as the CPU 302. In some embodiments, the computer system 301 may contain multiple processors typical of a relatively large system; however, in other embodiments the computer system 301 may alternatively be a single CPU system. Each CPU 302 may execute instructions stored in the memory subsystem 304 and may include one or more levels of on-board cache.

System memory 304 may include computer system readable media in the form of volatile memory, such as random access memory (RAM) 322 or cache memory 324. Computer system 301 may further include other removable/non-removable, volatile/non-volatile computer system storage media. By way of example only, storage system 326 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 304 can include flash memory, e.g., a flash memory stick drive or a flash drive. Memory devices can be connected to memory bus 303 by one or more data media interfaces. The memory 304 may include at least one program product having a set (e.g., at least one) of program modules that are configured to carry out the functions of various embodiments.

One or more programs/utilities 328, each having at least one set of program modules 330 may be stored in memory 304. The programs/utilities 328 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 328 and/or program modules 330 generally perform the functions or methodologies of various embodiments.

In some embodiments, the program modules 330 of the computer system 301 may include a software provisioning module. The software provisioning module may include computer instructions to appropriately provision software applications to authorized clients in response to client requests. Further, the software provisioning module may include computer instructions to calculate software application usage based on the session information and list of software packages.

Although the memory bus 303 is shown in FIG. 3 as a single bus structure providing a direct communication path among the CPUs 302, the memory subsystem 304, and the I/O bus interface 310, the memory bus 303 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 310 and the I/O bus 308 are shown as single respective units, the computer system 301 may, in some embodiments, contain multiple I/O bus interface units 310, multiple I/O buses 308, or both. Further, while multiple I/O interface units are shown, which separate the I/O bus 308 from various communications paths running to the various I/O devices, in other embodiments some or all of the I/O devices may be connected directly to one or more system I/O buses.

In some embodiments, the computer system 301 may be a multi-user mainframe computer system, a single-user system, or a server computer or similar device that has little or no direct user interface, but receives requests from other computer systems (clients). Further, in some embodiments, the computer system 301 may be implemented as a desktop computer, portable computer, laptop or notebook computer, tablet computer, pocket computer, telephone, smart phone, network switches or routers, or any other appropriate type of electronic device.

It is noted that FIG. 3 is intended to depict the representative major components of an exemplary computer system 301. In some embodiments, however, individual components may have greater or lesser complexity than as represented in FIG. 3, components other than or in addition to those shown in FIG. 3 may be present, and the number, type, and configuration of such components may vary.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
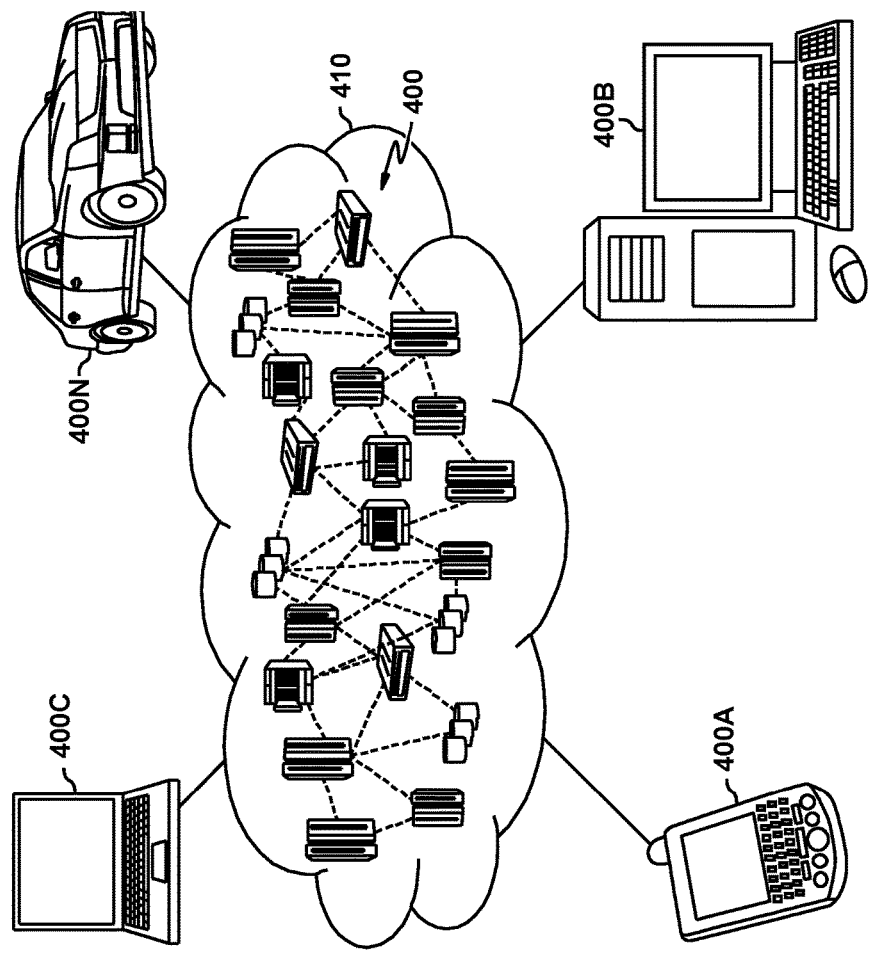
FIG. 4 is a diagram illustrating a cloud computing environment, in accordance with embodiments of the present disclosure.

Referring now to FIG. 4, illustrative cloud computing environment 410 is depicted. As shown, cloud computing environment 410 includes one or more cloud computing nodes 400 with which local computing devices used by cloud consumers, such as, for example, personal digital assistant (PDA) or cellular telephone 400A (e.g., client device 111), desktop computer 400B (e.g., client devices 110 and 112 and computing infrastructure 130) laptop computer 400C (e.g., client devices 110 and 112 and computing infrastructure 130), and/or automobile computer system 400N may communicate. Nodes 400 may communicate with one another. They may be grouped (not shown) physically or virtually, in one or more networks, such as Private, Community, Public, or Hybrid clouds as described hereinabove, or a combination thereof. This allows cloud computing environment 410 to offer infrastructure, platforms and/or software as services for which a cloud consumer does not need to maintain resources on a local computing device. It is understood that the types of computing devices 400A-N shown in FIG. 4 are intended to be illustrative only and that computing nodes 400 and cloud computing environment 410 can communicate with any type of computerized device over any type of network and/or network addressable connection (e.g., using a web browser).

Figure 5:
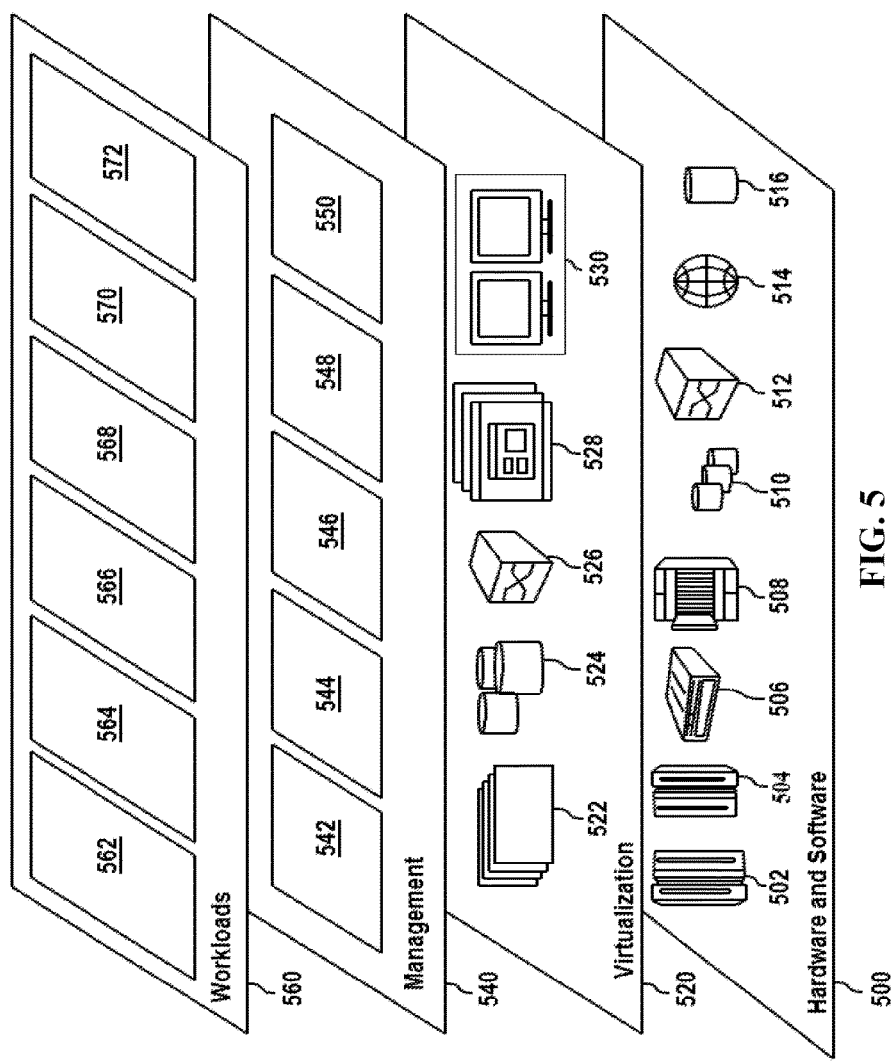
FIG. 5 is a block diagram illustrating abstraction model layers, in accordance with embodiments of the present disclosure.

Referring now to FIG. 5, a set of functional abstraction layers provided by cloud computing environment 410 (FIG. 4) is shown. It should be understood in advance that the components, layers, and functions shown in FIG. 5 are intended to be illustrative only and embodiments of the disclosure are not limited thereto. As depicted below, the following layers and corresponding functions are provided.

Hardware and software layer 500 includes hardware and software components. Examples of hardware components include: mainframes 502; RISC (Reduced Instruction Set Computer) architecture based servers 504; servers 506; blade servers 508; storage devices 510; and networks and networking components 512. In some embodiments, software components include network application server software 514 and database software 516.

Virtualization layer 520 provides an abstraction layer from which the following examples of virtual entities may be provided: virtual servers 522; virtual storage 524; virtual networks 526, including virtual private networks; virtual applications and operating systems 528; and virtual clients 530.

In one example, management layer 540 may provide the functions described below. Resource provisioning 542 provides dynamic procurement of computing resources and other resources that are utilized to perform tasks within the cloud computing environment. Metering and Pricing 544 provide cost tracking as resources are utilized within the cloud computing environment, and billing or invoicing for consumption of these resources. In one example, these resources may include application software licenses. In some embodiments, Metering and Pricing 544 indicates the number of allotted licenses to machines (e.g., devices 110, 111, and 112) in the system. Security provides identity verification for cloud consumers and tasks, as well as protection for data and other resources. User portal 546 provides access to the cloud computing environment for consumers and system administrators. Service level management 548 provides cloud computing resource allocation and management such that required service levels are met. Service Level Agreement (SLA) planning and fulfillment 550 provide pre-arrangement for, and procurement of, cloud computing resources for which a future requirement is anticipated in accordance with an SLA.

Workloads layer 560 provides examples of functionality for which the cloud computing environment may be utilized. Examples of workloads and functions which may be provided from this layer include: mapping and navigation 562; software development and lifecycle management 564; virtual classroom education delivery 566; data analytics processing 568; transaction processing 570; and identifying an identifiable media 572.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A software provisioning system for a computer system comprising client devices connected via a communication network to a computing infrastructure, the computing infrastructure being configured to provide, upon a user's request, a software application package to an already running machine, wherein the software provisioning system is configured to:
   retrieve session information about a user logged in to the computing infrastructure via a client device, thereby creating a session;
   determine a list of software application packages that the user is entitled to request to be provided to the running machine so that the user is able to use a software application contained in the software application packages; and
   calculate software application usage information from the session information and the list of software application packages.

2. The software provisioning system according to claim 1, wherein the session information includes at least one of a start date and time of the session, an end date and time of the session, a user identification associated with the session, and a client device identification.

3. The software provisioning system according to claim 1, wherein the software provisioning system is configured to determine at least one group of which the user is a member, identify a set of software applications the member of the group is entitled to use, and include the set of software applications in the list of software applications.

4. The software provisioning system according to claim 1, wherein the running machine is a virtual machine and wherein the computing infrastructure comprises a hypervisor for instantiating the virtual machine in response to a user logging into the computing infrastructure.

5. The software provisioning system according to claim 1, wherein the running machine is the client device.

6. A method for software provisioning for a computer system comprising client devices connected via a communication network to a computing infrastructure, the computing infrastructure being configured to provide, upon a user's request, a software application package to an already running machine, the method comprising:
   retrieving session information about a user logged into the computing infrastructure via a client device, thereby creating a session;
   determining a list of software application packages that the user is entitled to request to be provided to the running machine so that the user is able to use a software application contained in the application packages; and
   calculating software application usage information from the session information and the list of software application packages.

7. The method according to claim 6, wherein the session information includes at least one of a start date and time of the session, an end date and time of the session, a user identification associated with the session, and a client device identification.

8. The method according to claim 6, further comprising determining at least one group of which the user is a member, identifying a set of software applications the member of the group is entitled to use, and including the set of software applications in the list of software applications.

9. The method according to claim 6, wherein the running machine is a virtual machine and wherein the computing infrastructure comprises a hypervisor for instantiating the virtual machine in response to a user logging in to the computing system.

10. The method according to claim 6, wherein the running machine is the client device.

11. A computer program product for software provisioning in a computer system comprising client devices connected via a communication network to a computing infrastructure, the computing infrastructure being configured to provide, upon a user's request, a software application package to an already running machine, the computer program product comprising:

a computer readable storage medium having computer readable program code embodied therewith, the computer readable program code being executable by a processor to perform a method comprising:

retrieving session information about a user logged into the computing infrastructure via a client device, thereby creating a session;

determining a list of software application packages that the user is entitled to request to be provided to the running machine so that the user is able to use a software application contained in the software application package; and calculating software application usage information from the session information and the list of software application packages.

12. The computer program product of claim 11, wherein the session information includes at least one of a start date and time of the session, an end date and time of the session, a user identification associated with the session, and a client device identification.

13. The computer program product of claim 11, wherein the method further comprises determining at least one group of which the user is a member, identifying a set of software applications the member of the group is entitled to use, and including the set of software applications in the list of software applications.

14. The computer program product of claim 11, wherein the running machine is a virtual machine and wherein the computing infrastructure comprises a hypervisor for instantiating the virtual machine in response to a user logging in to the computing system.

15. The computer program product of claim 11, wherein the running machine is the client device.

\* \* \* \* \*